Nov. 10, 1970  A. J. GIRARD  3,539,261
SPECTROPHOTOMETER

Filed June 8, 1967  5 Sheets-Sheet 2

Nov. 10, 1970 A. J. GIRARD 3,539,261
SPECTROPHOTOMETER

Filed June 8, 1967 5 Sheets-Sheet 5

INVENTOR
ANDRÉ JEAN GIRARD 3,539,261
SPECTROPHOTOMETER
André Jean Girard, Chatillon-sous-Bagneux, France, assignor to Office National d'Etudes et de Recherches Aerospatiales, Chatillon-sous-Bagneux, France
Filed June 8, 1967, Ser. No. 644,578
Claims priority, application France, June 16, 1966, 65,730
Int. Cl. G01j 3/42
U.S. Cl. 356—93                                    18 Claims

ABSTRACT OF THE DISCLOSURE

A radiant flux originating at a source of radiation is split into a reference beam and a measuring beam, the latter traversing a sample to be spectrometrically analyzed. The two beams, traveling to a receiver over a common path including a dispersive system and a mirror vibrating about an axis which is parallel to the direction of spectrum spread, are differentiated from each other by traversing different pairs of input and output gates with optically equivalent and optically complementary zonal patterns, respectively. During every oscillatory cycle of the mirror, of the radiation contains a certain wavelength, at least one sharp pulse is generated by the output energy of each beam as the mirror passes through a position of adjustment while the dispersive system is set to detect that wavelength; these pulses, being of opposite sign, cancel if there is no energy absorption by the sample and otherwise result in an amplitude modulation, of a depth proportional to such absorption, which can be determined with the aid of a suitably tuned AC amplifier.

---

This application discloses subject matter disclosed in my prior United States patent applications and patents identified below: Ser. No. 31,690, filed May 25, 1960, now Pat. No. 3,211,048; Ser. No. 175,911, filed Feb. 27, 1962, now Pat. No. 3,343,446; Ser. No. 437,088, filed Mar. 4, 1965 as a continuation-in-part of application Ser. No. 31,690; now Pat. No. 3,211,048; Ser. No. 411,254, filed Nov. 16, 1964, now Pat. No. 3,383,978; Ser. No. 414,627, filed Nov. 13, 1964, now Pat. No. 3,411,851.

The invention relates to a spectrophotometer.

In spectrophotometry, it is frequently desired to determine the absorption characteristics of a medium to be studied by causing a flux of radiation, or measuring flux, to traverse the latter, the desired data being usually obtained by comparison with information derived from another flux of radiation, or reference flux, which has not passed through the medium being studied. For data of precision, it is necessary that all the experimental conditions, other than those arising from the traversal or nontraversal of the medium under study, be identical.

The study is usually made by "scanning the wavelengths," such scanning being usually effected by rotation, often at uniform speed, of the device for spreading the spectrum (prism or grating). It has been proposed to effect with a spectrophotometer a first scanning without the interposition of the medium to be studied, providing first spectrophotometric data (generally in the form of a curve), and then a second scanning identical with the first one during which the flux of radiation passes through the medium to be studied, the comparison of the second curve thus obtained with the first curve providing data on the absorption of the medium studied.

It has also been proposed to record on a magnetic memory the results of a first scanning, the reading of this recording being then effected simultaneously with a second scanning differing from the first by the presence or absence of the absorption medium.

In both cases, it is necessary to effect two successive scannings, each of which can last for a substantial time, and to conserve strictly the same external conditions in the course of two scannings. In the first case, moreover, it is necessary to resign oneself to a task of analysis, which can be long and tedious.

To overcome these drawbacks, it has been proposed to use a common spectrometer for the quasi-simultaneous treatment of the two reference beams. The installation then comprises optical commutation means for one beam of radiation, emitted from a single source, to form in alternate succession the measuring beam and the reference beam. The data on the medium are then derived from a receiver following the spectrometer, and struck alternately by the measuring beam and the reference beam. In such a spectrophotometer, the spectrometer used is a slit spectrometer, i.e., one which comprises at its input a narrow slit and, at its output another narrow slit optically coupled with the first; for each position of the system spreading the spectrum, these slits isolate, from the flux of radiation entering the spectrometer, the part of the energy carried on a given wavelength corresponding to said position of the spreading system.

In my above-identified applications and patents I have disclosed spectrometers with surfacial input and output gates, i.e., devices having distributed over a surface of substantial area, considerably greater than that of a slit, two pluralities or sets of zones or areas of different optical conveying characteristics. These spectrometers are sometimes referred to below as grid spectrometers, but it is to be understood that this expression is not intended to be limited to spectrometers having input and output elements with zones of rectilinear limits but includes spectrometers whose zones have other forms, the only condition being that a spectrometer equipped with such input and output elements when traversed by a monochromatic flux while the dispersive system is being rotated (a technique sometimes called scanning the wavelengths) has an output energy which can be represented, as a function of the position of the dispersive system, by a curve showing a sharp pulse for the adjustment position of the dispersive system which corresponds to the wavelength of the monochromatic flux and which is flanked by very gently sloping portions, the height of the pulse representing substantially half the energy which has traversed the input device and the height of the gently sloping portion being, in the neighborhood of the pulse, equal to the height of the pulse. Such spectrometers, whilst having a resolving power which may be as high as that of slit spectrometers, have a considerably higher luminosity.

Now, up to the present, a spectrometer with a "surfacial" input and output cannot be used for double-beam absorption spectrophotometry, in which commutation means render successively operational, on a receiver or pickup device, a measuring beam and a reference beam. With such a spectrometer, if the light source is a polychromatic source, which is the usual case, both the reference beam and the measuring beam falling on the receiver can carry, besides energy on the so-called adjustment wavelength corresponding to the position of the spreading or dispersive system (prism or grating), energies on other wavelengths, the total of which may moreover be considerably greater than that of the energy carried on the adjustment wavelength, so that the comparison between the energies received alternately by the receiver, and arising respectively from the measuring beam and the reference beam, would not show the influence of the medium traversed by the measuring beam on the energy carried on the adjustment wavelength alone, and thus would not furnish useful data.

Besides, the total energy carried by the reference beam and the total energy carried by the measuring beam may be very different from one another; since the frequency of commutation, causing switchover from the measuring beam to the reference beam and back, must be relatively high for the apparatus to be of practical value, the pickup device receiving alternately said energies would be subjected, for a given position of the spreading system, to sharply and rapidly varying influences, which would cause the appearance of transient states, specially if the pickup device concerned is sensitive to relatively large wavelengths, such as those of infra-red radiation, and the signals that it would yield would be useless.

It is an object of the invention to provide a spectrophotometer which, although possessing a "grid" or surfacial input and output device, can nonetheless be used in a double-beam arrangement.

It is therefore a more particular object of the invention to provide a spectrophotometer, useful in absorption spectrophotometry, exhibiting the simultaneous qualities of large resolving power and high luminosity which are characteristic of grid spectrometers.

It is consequently an object of the invention to provide a spectrophotometer which appreciably extends the possible applications of absorption spectrophotometry.

It is, specially, an object of the invention to provide a "grid" absorption spectrophotometer which enables to obtain at any moment the absorption coefficient of a medium by direct reading.

The invention will be well understood from the following description of several embodiments selected by way of example. For this description, reference is made to the accompanying drawing in which.

Figures 1, 2:
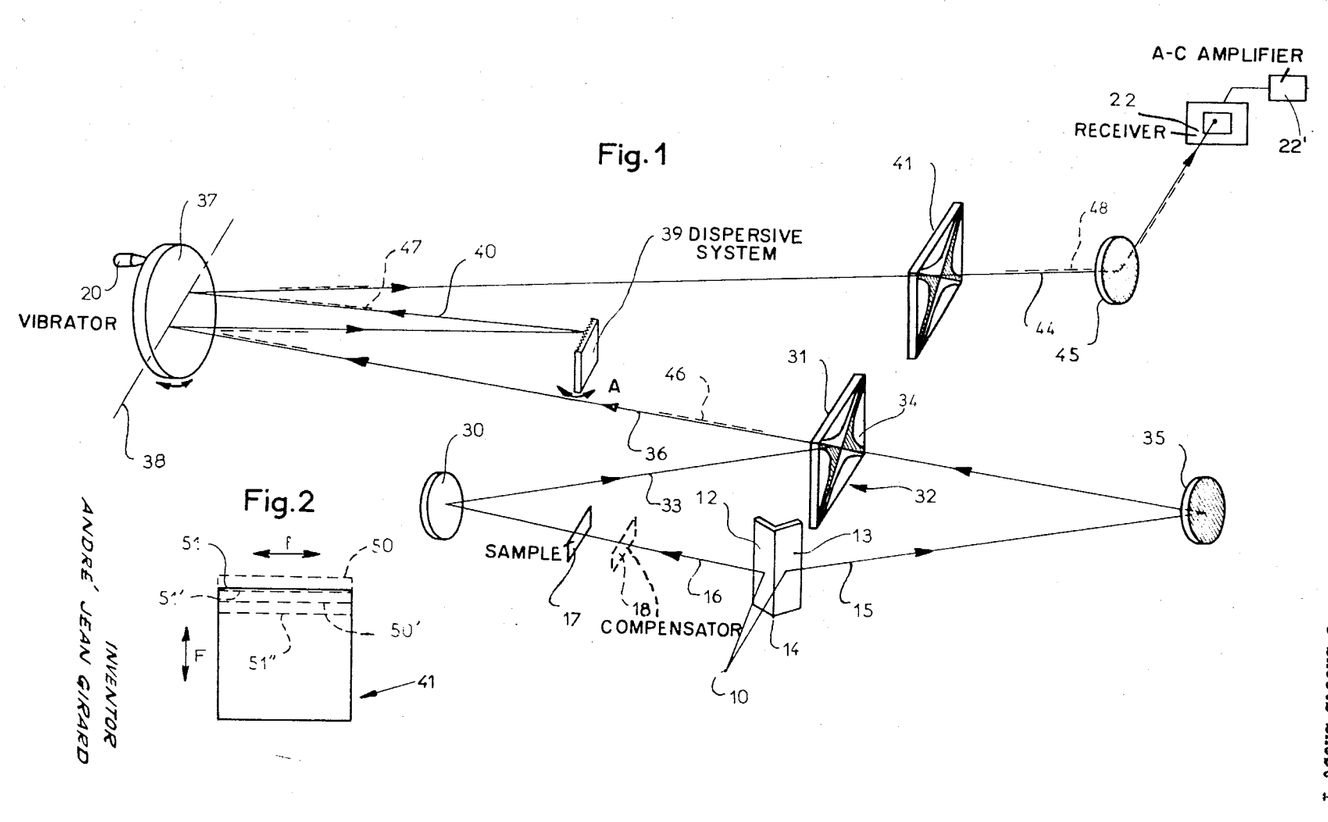
FIG. 1 is a schematic perspective view of an embodiment of a spectrophotometer according to the invention.
FIG. 2 is schematic view of an output device forming part of the spectrophotometer.

Reference is first made to FIG. 1, relating to a first embodiment of a spectrophotometer according to the invention. Opposite a radiation source 10 is placed a device for dividing the radiation, schematically represented by two plane mirrors 12 and 13, symmetrically placed with respect to the plane passing through the source 10 and the intersection 14 of the planes of the mirrors, which thus provide two beams of radiation 15 and 16 of strictly the same spectral composition. One of these beams is designated to the reference beam 15 and the other the measuring beam 16.

In the path of the measuring beam 16 is placed, with the possible interposition of a compensating plate 18, the sample 17 whose absorption power it is desired to determine with respect to radiation of various wavelengths emitted by the source 10. The measuring beam 16 is reflected by a concave mirror 30 on a face 31 of an input device or "grid" 32 comprising two pluralities of zones of different radiation transmissivity, i.e., respectively transparent and reflecting. The reflecting zones, in this example, are borne by the face 34 of device 32 opposite face 31.

The input device 32 derives from the incident beam 33 —besides a beam arising from the traversal of its transparent zones and which is not used for the rest of the treatment—a beam 36 trained by its reflecting zones via a parabolic mirror 37, mounted for oscillation around an axis 38, towards a dispersion grating 39, the axis 38 being parallel to the direction of dispersion or spreading provided by the grating. A vibration around axis 38 is applied to the mirror 37 by an exciter, as schematically shown at 20. The dispersed measuring beam 40 is directed by another reflection on the vibrating mirror 37, towards an output device or grid 41.

The output grid 41 has a constitution which is identical with or close to that of grid 32 and has two sets of zones of different radiation transmissivity, i.e., transparent and opaque zones whose relative arrangement is similar to the pattern of zones of the input device 32. In fact, the output grid 41 is, as regards its zones, in registry with the image of the input grid 32 provided by a monochromatic radiation for a given position of the dispersive system 39, i.e., the adjustment position for the wavelength of this radiation, and for a given position, i.e., position of coincidence, of the mirror 37 during its vibration, the coincident superposition ceasing as soon as the mirror 37 departs from said given position.

In the embodiment shown, the zones are bounded by branches of equilateral hyperbolae, symmetrically arranged around the center of the device which is thus the intersection of their asymptotes.

The beam 44, formed by those rays of the beam 40 which have traversed the output grid 41, is conveyed by a concave mirror 45 toward a receiver or pickup device 22 controlling a load 22'.

The reference beam 15 is reflected by a mirror 35, symmetrical to mirror 30 with respect to the plane passing through the source 10 and the intersection 14 of the planes of the beam-splitting mirrors 12 and 13, towards the other face i.e. the outer face of the input grid 32. It forms, after traversal of the transparent zones of the input grid 32, a plurality of pencils which constitute a beam 46 (schematically shown by a broken line) practically merged spatially with the beam 36. The beam 46, after reflection on the vibrating mirror 37, is spread by the grating 39 to form a dispersed beam 47 which, after another reflection on the vibrating mirror 37, is directed onto the output grid 41; the pencils 48 which traverse this grid through its transparent zones constitute the reference beam proper, which is reflected by the mirror 45 towards the pickup device 22.

The shapes of the zones and their distribution on the input and output devices may be the most varied, provided that in the case where the apparatus is traversed by a radiation of a single wavelength, when scanning the wavelengths from the adjustment position of the dispersive system for said wavelength, the quantity of energy traversing the output device 41 be representable— when mirror 37 is immobilized in its position of coincidence—by a sharp pulse whose apex corresponds to the adjustment position of the dispersive system and which is flanked by substantially horizontal portions, and that a similar diagram be obtained when the dispersive system is immobilized in the adjustment position and the mirror is caused to vibrate from its position of coincidence.

In FIG. 2, there is indicated schematically by a rectangular outline the useful part of the output device 41 of FIG. 1, the asymptotes of the branches of the equilateral hyperbolae forming the diagonals of the square contour. For the adjustment position of the dispersive system 39, and the position of coincidence of the mirror 37, the projected image of the useful part of the input device is superimposed on the useful part of the output device. When scanning the wavelengths, starting from said adjustment position, the image of the useful part is displaced in one direction or the other of the double arrow $f$, shown parallel to the horizontal sides of the contour.

If the dispersive system 39 is immobilized in its adjustment position, the deflection of mirror 37 from its position of coincidence causes the displacement of the image of the useful part of the input device in a direction transverse to that of the double arrow $f$, that is to say, in that of the double arrow F.

If the position of coincidence of the mirror 37 is at the midpoint of its vibration, the images of the horizontal sides of the contour of the useful part of the input device, during the vibration, oscillate between two extreme positions, schematically shown at 50 and 50' for the image of one edge of the contour.

If the position of coincidence of the mirror 37 is at an end of the vibratory strobe, the image of a horizontal edge of the contour of the useful part of the input device oscillates on one and the same side with respect to the conjugate horizontal side of the contour of the useful part of the output device.

Naturally the contour of the useful part of the output device and the image of the contour of the useful part of the input device may have a form differing from the rectangular form shown.

The oscillation frequency of the mirror 37 is so selected that the scanning, due to the movement of the grating 39 or similar device, of a range of wavelengths consistent with the resolving power of the spectrometer should take a time equal to several periods of the oscillation of the mirror, for example 100 to 200 periods, a preferred minimum being 10 periods.

Figure 3:
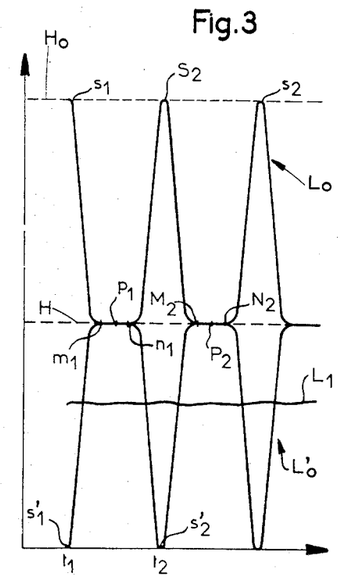
FIG. 3 shows graphs.

FIG. 3 is a diagram showing the variations in radiant energy of a wavelength corresponding to the position of the spreading system 39, contained in the output reference beam 48, as a function of time plotted on the abscissae. At each position of coincidence of mirror 37, which for purposes of the present explanation is assumed to coincide with midpoint of the vibration, all the energy having traversed the transparent zones of the input device 32 traverses the transparent zones of the output device 41; for this position, therefore the images of the transparent zones of the input device 32 register with the transparent zones of the output device 41. This energy amplitude is shown by the peaks $s_1$, $s_1$ of the graph. From such a position, occurring for instance at time $t_1$, whatever the direction of displacement of mirror 37, the quantity of energy carried by beam 48 decreases suddenly from the value $s_1$ to a mean value $m_1$, which is half of the peak $s_1$, in the case where the total of the areas of the zones of one set is equal to the total of the areas of the zones of the other set upon continued displacement of mirror 37 with respect to its mean position, the quantity of energy carried by beam 48 then remains substantially constant until the mirror has reached one of its end positions, represented by the point $p_1$ of the graph $L_0$. Then the mirror 37 swings back to its mean position and the energy carried by the beam 48 continues to remain substantially constant up to point $n_1$, symmetrical to $m_1$ with respect to $p_1$ and placed on the same horizontal line H; it then increases suddenly to a new maximum, shown by the point $s_2$, of the same amplitude as the point $s_1$ and reached, in said mean position of the mirror 37, at a time $t_2$. The mirror 37 then swings beyond its mean position, in the direction opposite to the one initially considered; the energy carried by the beam 48 decreases at first suddenly to $M_2$, to reach a mean amplitude equal to half its peak value, which then remains substantially constant up to $N_2$, symmetrical to $M_2$ with respect to $P_2$, in the other end position of the mirror 37, and then increases again suddenly to the peak $s_2$ of the same amplitude as peaks $s_1$ and $S_2$. From $s_2$, the cycle described before, starts again.

If the reference beam carries a radiation of another wavelength, differing from the adjustment wavelength corresponding to the grating position just considered by, an amount larger than that which corresponds to the resolving power of the spectrometer, whilst being sufficiently close of the latter to provide an image of the input device which still has an area of superposition with the output device, and if there is plotted on the same diagram the graph representative, as a function of time, of the energy of this wavelength reaching the pickup device 22 in the output reference beam for the same position of the dispersive system 39 during the vibration of mirror 37, there is then obtained a substantially horizontal line, as shown for instance at $L_1$: at no moment, during the vibration of mirror 37, is there any zone-by-zone coincidence of the image of the input device, projected by this radiation of a wavelength other than the above-considered adjustment wavelength, with the output device. The quantity of energy on such nonselected wavelength carried by the beam 48 past the output gate 41 to the pickup device is then constantly half the energy of this wavelength which reaches the output gate and is thus equal to a fourth of the energy, on this wavelength, which reaches the input gate 32 through the input reference beam, owing to the equality of the total of the areas of the transparent zones and of the total of the areas of the nontransparent zones of the input gate.

If, now, there is plotted, on the same diagram as that which has been considered, the graph of the radiant energy reaching the pickup device 22 on the wavelength corresponding to the adjustment position of the grating but carried on the measuring beam 44 rather than on the reference beam which has been considered above, in the absence of sample 17, the graph is the one shown at $L_0'$ in FIG. 3. At time $t_1$, with mirror 37 in its position of coincidence, the transparent zones of the output device 41 individually register with the images of the transparent zones of the input device 32 which do not convey the measuring beam towards the mirror 37 and the dispersive system 39; the images of the reflecting zones of the device 32 individually register with the opaque zones of the device 41; the pencils constituting beam 36, and arising from the reflection of beam 16 on the reflecting zones of the input device 32, all fall after (reflection on the mirror 37, spreading by the grating 39 and another reflection on the mirror 37) on opaque zones of the output device 41; the beam 44 does not therefore carry any energy on said wavelength. The point $s_1'$, therefore, represents a trough of zero amplitude. As soon as the mirror 37 leaves its mean position of coincidence, a part of the pencils constituting the beam 40 falls on parts of the transparent zones of the output device 41 and the beam 44 carries energy; the increase is very rapid and, in fact, the graph obtained is symmetrical to graph $s_1-m_1$ with respect to the horizontal line H, until it reaches point $m_1$. From point $m_1$ on, which corresponds to half the energy on the adjustment wavelength carried by the measuring beam and reaching the output device, the graph merges with the part $m_1-n_1$ of the previous graph; from $n_1$ on, it departs from the latter and after a rapidly descending step returns to the value zero at $s_2'$, at time $t_2$, etc.

The graph representative of the energy carried by the output measuring beam 44 is thus symmetrical to the one of the energy carried by the output reference beam 48 with respect to the horizontal line H, taking into account the interposition of the compensating plate 18 whose role is to compensate the losses of the measuring beam due to the reflections on the optical support for the grid 32 and by the traversal of the said support. With pickup device 22 receiving simultaneously the output reference beam 48 and the output measuring beam 44, the signal emitted by it provides, during the vibration of mirror 37, when the apparatus is traversed only by a radiation having the wavelength corresponding to the adjustment position of the dispersive system 39 for this wavelength, has a constant amplitude equal to the ordinate of the horizontal line $H_0$ passing through the points $s_1$, $S_2$, $s_2$, etc.

If one considers now the energy carried by the output measuring beam 44 on a wavelength other than the adjustment wavelength of the spreading system 39, for instance that which has been considered above for the energy carried by the output reference beam 48, the graph representative of said energy is also constituted by a substantially horizontal line, and the latter is merged with the substantially horizontal line $L_1$ representative of the energy on this wavelength in the output reference beam. The distribution of the images of the zones of the input device projected by the radiation of this wavelength with respect to the distribution of the zones of the output device remains in fact substantially the same during the vibration of mirror 37. The energy carried by the output reference beam 48 and the energy carried by the output measuring beam 44 for any radiation of a wavelength other than the adjustment wavelength, and traversing the spectrometer, are thus represented by the same line on the diagram of FIG. 3. The combined output signal emitted by the photoelectric receiver 22, therefore, has a magnitude equal to twice the amplitude of line $L_1$, this being substantially lower than the level $H_0$.

Figure 4:
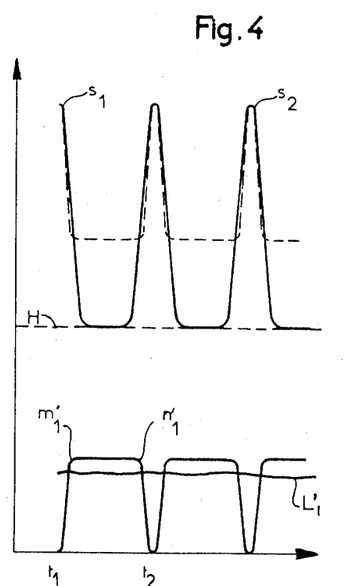
FIG. 4 shows other graphs.

When the sample 17 is placed in the measuring beam, there results an absorption of radiation which may be variable with wavelength, and the energy carried by the measuring beam past the input device 32 is smaller than the energy carried by the reference beam past said device. FIG. 4 shows graphs similar to those of FIG. 3, but for this new condition. Whereas the upper curve, corresponding to the output reference beam, remains the same as in FIG. 3, as shown in full lines in the upper part of FIG. 4, this is not true for the lower curve, corresponding to the output measuring beam. During the vibration of mirror 37, the energy carried by the output measuring beam, which has a zero value for the mean or coincidence position of said mirror, increases very rapidly, but only to a value $m_1'$ smaller than value $m_1$; it then remains constant up to the point $n_1'$, then drops back to zero at time $t_2$, when mirror 37 takes up again its position of coincidence, etc.

The energy carried by the output measuring beam on a radiation having a wavelength differing from the adjustment wavelength is, everything else being unchanged, smaller than that carried by said output measuring beam when the sample is not in place. For instance, the graph representative of this energy when the sample is not in position, i.e. the line $L_1$ of FIG. 3 becomes the line $L_1'$ when the sample is in position (the scales of the abscissae and of the ordinates being the same for the graphs of FIGS. 3 and 4).

During the operation of the spectrophotometer, the pickup device 22 receives simultaneously the energies carried by the output reference beam, as passed by the optically equivalent patterns of gates 31 and 42, and the output measuring beam, as passed by the optically complementary patterns of these gates, and this for all the wavelengths of the radiation traversing the spectrometer. When there is no sample interposed in the measuring beam, there is no output signal with an AC component delivered by the pickup device 22, since for radiation on the adjustment wavelength the signals $s_1$, $m_1$, $n_1$, $S_2$, $M_2$, $N_2$ corresponding to the output reference beam and the signals $s_1'$, $m_1$, $n_1$, $S_2'$, $M_2$, $N_2$ (FIG. 3) corresponding to the output measuring beam are, with respect to the horizontal line H, constantly of the same amplitude and in opposite phase whereas for another radiation, not having the adjustment wavelength, the output reference beam and the output measuring beam both carry a constant energy, these energies being moreover equal to each other, as shown by line $L_1$. It is therefore a continuous component which appears at the output of the pickup device 22. If the pickup device is followed by an AC amplifier, representing the load 22', the signal collected at the output of said amplifier is constantly nil.

On the other hand, as soon as a sample has been interposed in the measuring beam 16, there appears a modulated component at the output of the pickup device 22 which has the same frequency as the periodic signals shown in FIG. 4 and whose amplitude is equal to the difference of the amplitudes of said signals. A graph representative of the modulated output of the pickup device is shown in broken lines on FIG. 4, the ordinates of said graph being equal at any time to the sum of the ordinates of the periodic graphs shown in full line. Thus, the influence of the energy on any wavelength other than the adjustment wavelength upon the output of the AC amplifier is nil, the corresponding signal delivered by the pickup device 22 being substatnially of constant value, as shown at $L_1'$, and consequently not amplified. The amplitude of the modulated output increases with the absorption of the sample 17 for the radiation of the adjustment wavelength corresponding to the position of the dispersive or spreading system 39; it is therefore characteristic of the absorption of said wavelength by the sample.

If the AC amplifier following the pickup device is tuned to the frequency of modulation, there is collected at the output of said amplifier a signal whose amplitude is characteristic of the absorptivity of the sample for the adjustment wavelength of the dispersive system.

For the setting of the apparatus, the input device 32 and/or the output device 41 are advantageously mounted for translation in a direction perpendicular to the direction of spectrum spread, i.e., perpendicular to the double arrow $f$ of FIG. 2, so as to vary the zonal superposition of the image of the input device with respect to the output device depending on the vibrating movement of mirror 37. One can thus pass from the operating condition which has just been described, for which the position of coincidence is the midposition of mirror 37 during its vibration, to that in which the coincidence appears in an end position of the vibrating mirror 37.

Figure 5:
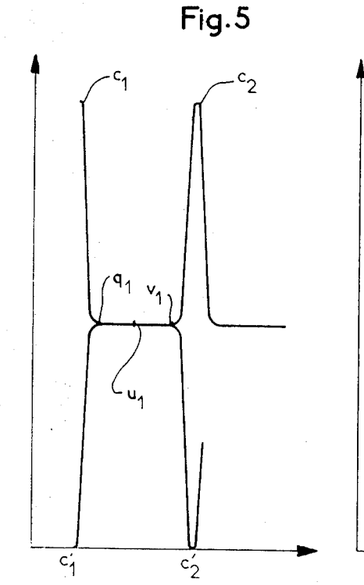
FIG. 5 shows graphs similar to those of FIG. 3, but for a modification.
Figure 6:
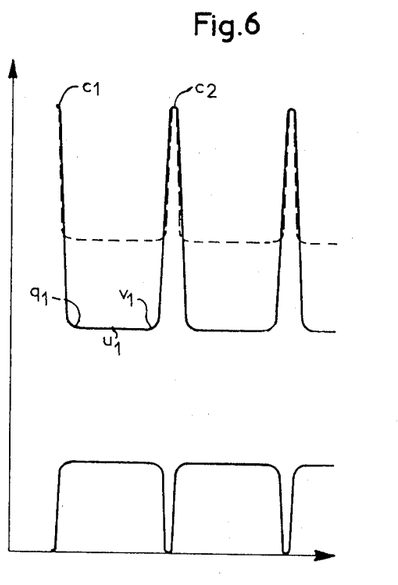
FIG. 6 shows graphs similar to those of FIG. 4, but for this modification.

For this latter condition, the corresponding graphs, similar to those shown on FIGS. 3 and 4, are then those of FIGS. 5 and 6 respectively. The point $c_1$ corresponds to the position of mirror 37 for which the image of the input device is in zonal registry with the output device, as schematically indicated in FIG. 2 by the superposition an image 51' of the upper edge of the rectangular contour of the useful part of the input device and the edge 51 of the contour of the useful part of the output device (in the figure, the image 51' is slightly displaced with respect to side 51 to enable these to be distinguished). As soon as mirror 37, during its vibrating movement, departs from this end position, the quantity of energy carried by the output reference beam on the adjustment wavelength and received by the pickup device 22 decreases suddenly along the curve $c_1-q_1$ similar to the curve $s_1-m_1$, and then remains substantially constant during the movement of mirror 37 which brings the image of the upper edge to the other end position, shown at 51", and also during the major part of the return course, up to the immediate vicinity of the other end position, as shown schematically by the point $v_1$, symmetrical to point $q_1$ with respect to the point $u_1$ corresponding to the end of the stroke of the mirror in which the image of the edge is at 51". The energy then suddenly increases to a maximum $c_2$, having the same amplitude as $c_1$, for the position of mirror 37 in which, again, the image of the input device is in zonal registry with the output device, and so on. The operation is therefore analogous to that of the previous condition, except that the variation of energy on the adjustment wavelength received by the pickup device 22 has here the same frequency as that of the vibration of the mirror, while in the previous condition it had twice this frequency.

The energy received during the vibration of mirror 37 by the pickup device 22 for a radiation having another wavelength, differing from the adjustment wavelength by an amount greater than that which corresponds to the resolving power of the spectrometer, is, as in the previous embodiment, representable by a substantially horizontal line.

There is shown in the lower part of FIG. 5 a graph $c_1'-q_1-v_1-c_2'$ representative of the energy on the adjustment wavelength delivered to the pickup device 22 by the measuring beam, before insertion of a sample.

The graphs in FIG. 6 are identical with the graphs of FIG. 5, but apply to the situation after insertion of a sample in the measuring beam in the case where the apparatus is traversed by a radiation of a single wavelength.

The signal provided by the pickup device 22 receiving simultaneously the measuring and reference beams is a modulated signal, as shown in broken line in FIG. 6, similar to that of FIG. 4, but the modulation frequency of which is equal to that of the vibration of mirror 37 and not to twice this frequency, as in the case of FIG. 4.

At the output of an AC amplifier tuned to the vibration frequency of mirror 37, there is collected a signal whose amplitude is characteristic of the absorptivity of the sample for a radiation whose wavelength is the adjustment wavelength of the dispersive system 39.

Figure 7:
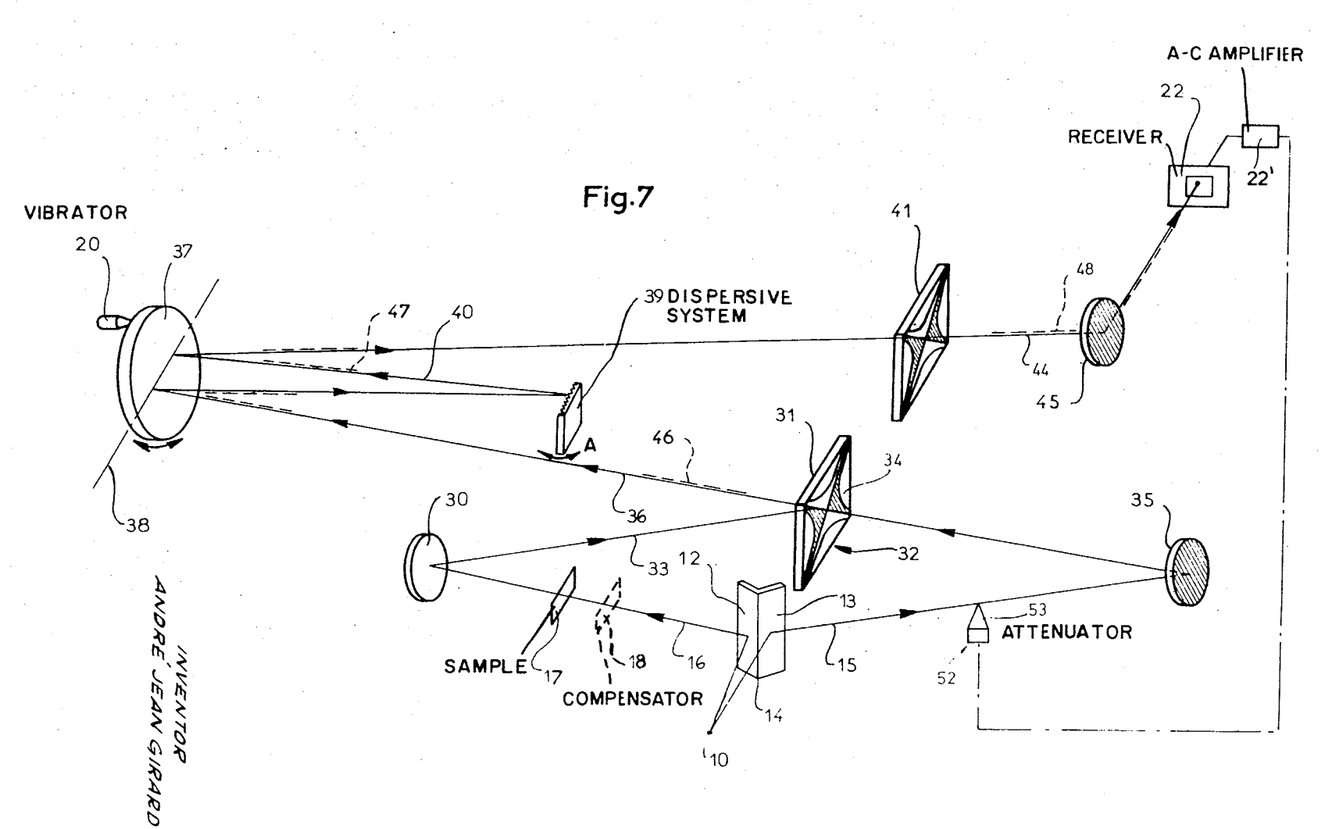
FIG. 7 is a schematic view similar to that of FIG. 1 but for a particular embodiment.

Reference is now made to FIG. 7. The embodiment shown schematically in this figure is similar to that which has just been described. However, the signal issuing from the pickup device 22 is, after amplification in an amplifier 22' tuned to the frequency of vibration of mirror 37 or to a multiple of this frequency, applied as a control signal to an attenuating device 52 designed to mask in an adjustable manner, the input reference beam 15. The device 52 comprises, for example, a comb shown schematically at 53, known per se, whose displacement, transverse to the beam results in the variation of the quantity of energy which the latter carries, downstream of the attenuator, such variation being proportional to this transverse displacement. There is thus constituted a chain of regulation which tends to maintain at a zero value the signal resulting from the combination of the signals provided respectively by the reference beam and by the measuring beam, the displacement of the attenuator 53 being thus directly related to the absorption by the sample of the radiation carried by the measuring beam at a wavelength which corresponds to the position of the dispersive system 39. One can thus know, by simple reading of a scale behind a pointer connected to the attenuator, the value of the coefficient of absorption for each of the wavelengths contained in a flux of radiation.

If the attenuator is connected to a stylus, the curve drawn by the stylus represents, in the course of a scan of a spectrum, the variation of the coefficient of absorption of the sample as a function of the wavelengths of radiation.

Figure 8:
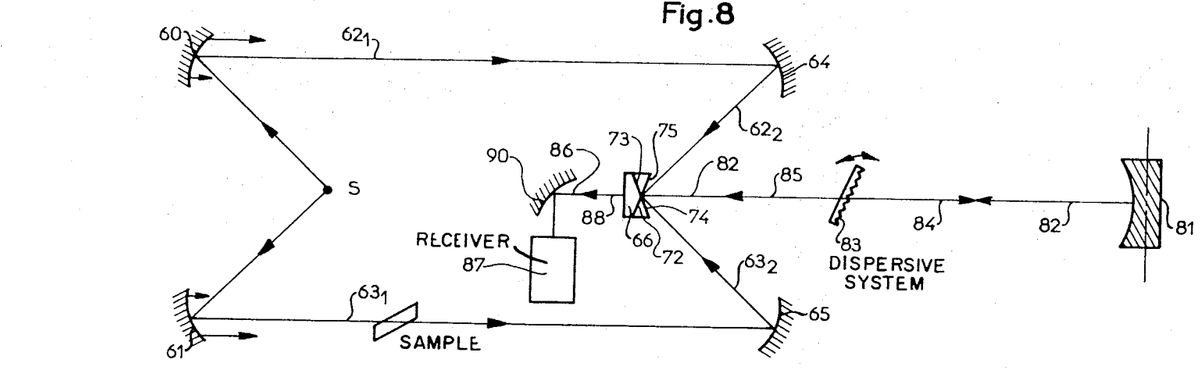
FIG. 8 is a schematic plan view of a spectrophotometer according to the invention, but for another embodiment.
Figure 9:
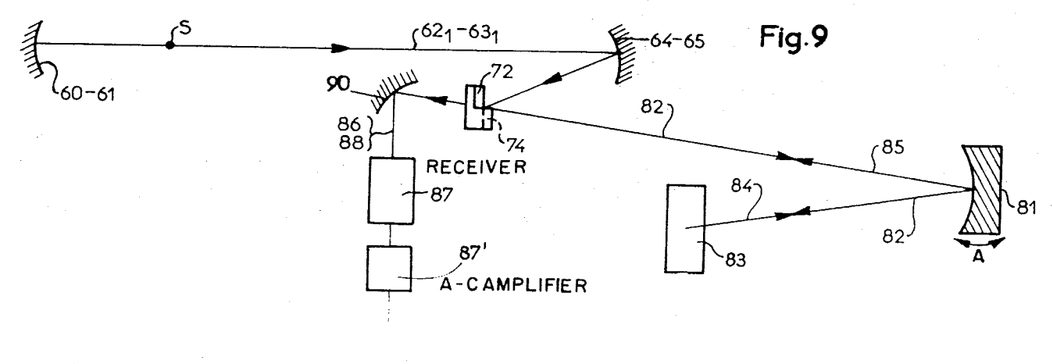
FIG. 9 is a corresponding schematic view in elevation.

Reference is now made to FIGS. 8 and 9, relating to another embodiment of a spectrophotometer according to the invention. In this embodiment, concave mirrors 60 and 61 provide, from radiation originating at a source S, beams $62_1$ and $63_1$ which are respectively constituting the reference beam and the measuring beam. The beams $62_1$ and $63_1$ are reflected, respectively, by mirrors 64 and 65 onto a device which is characteristic of this embodiment.

The device 66 is constituted by a block 67 (FIGS. 10 and 11) of transparent material, of general parallelepipedic form with a plane transverse rear face 68, a plane side face 69 perpendicular to face 68, and another side face 70 parallel to face 69. The frontal end face 71 has facets 72, 73 and 74, 75 of square outline, of the same surface area. The facets 72 and 73 are symmetrical to one another with respect to a plane passing through their intersection 76 at right angles to the face 68. The facets 74 and 75 are sym-metrical to one another with respect to the same plane, their intersection 77 being aligned with the intersection 76. The facets 72 and 74 and the facets 73 and 75 are symmetrical with respect to a plane passing through the line 76–77 parallel to the frontal face 68.

Figure 10:
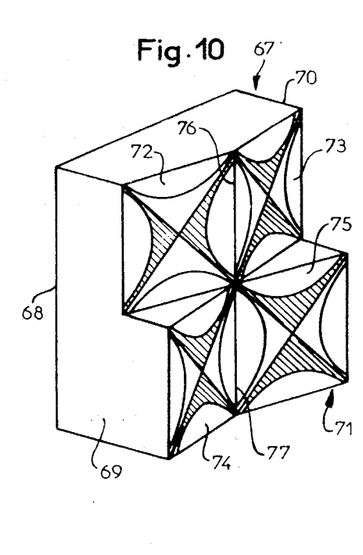
FIG. 10 is a schematic view in perspective of a device characteristic of this embodiment.
Figure 11:
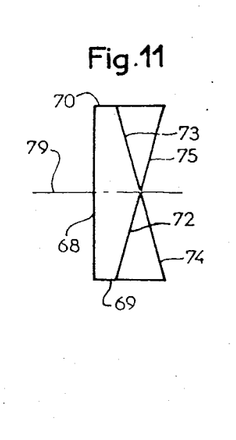
FIG. 11 is a view from above, on a smaller scale, of the device shown in FIG. 10.

The facets 72, 73, 74, 75 all bear the same pattern of zone boundaries and on each of the facets the zones form two sets differing from one another by their conveyance character with respect to the radiation which falls on them, being alternately transparent and reflecting, which has been represented on the drawing by the absence of hatching on the transparent zones and a hatching of the reflecting zones.

On each of the facets, the design of the zones satisfies the condition which has been mentioned above, namely that if an input device and an output device comprising said design are used in a spectrometer receiving monochromatic radiation and if a scanning in wavelengths is performed, the energy of the beam at the output of the spectrometer varies in an abrupt manner so as to peak for the position of the dispersive system corresponding to the wavelength of the said radiation, the peak being blanked, on the graph representing said energy, by substantially horizontal portions, a variation of the energy according to a similar law being obtained when the dispersive system remains fixed and, starting from a registering position, the image of the input device is shifted with respect to the output device in a direction transverse to that of the scan.

In the embodiment illustrated in FIGS. 8–11, the zone boundaries form a design with branches of equilateral hyperbolae which, in FIG. 10, has been considerably simplified. In fact, each of the facets bears hundreds of branches of the hyperbolae, FIG. 12 being an example of the design of such a facet, the branches of the hyperbolae cutting segments of equal length on any imaginary line parallel to an asymptote. Tht total of the areas of the zones of one set is equal to the total of the areas of the zones of the other set and the asymptotes of the branches of the equilateral hyperbolae form the diagonals of the facet.

Figure 12:
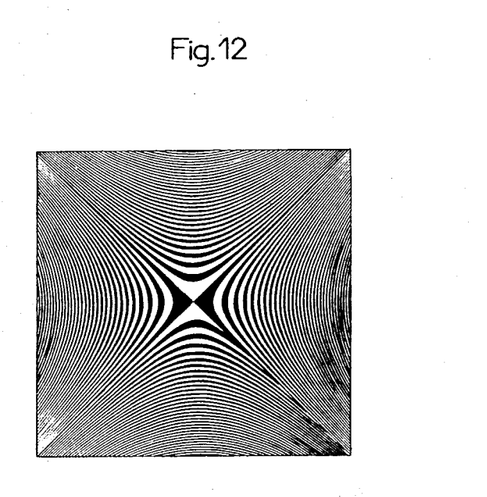
FIG. 12 is a front view on a larger scale of a zoned input or output element or device.

The zones of the pair of relatively inclined facets 74, 75 on the lower lever having the same conveyance character, form optically and geometrically identical patterns. For the other pair of relative inclined facets, i.e., upper-level facets 72, 73, the patterns are geometrically identical but optically complementary: each zone of the facet 72 having the same position as a zone of the facet 73 has a different conveyance charatcer. FIG. 12 has a more detailed showing of the zones in a grid whose facets are beveled with reference common to a transverse plane parallel to the end face 68.

The block 67 is so positioned that the intersection line 76, 77 of its facets is perpendicular to the direction of spectrum spread and that the beams falling on said facets are reflected or traverse said block along the paths schematically shown in FIGS. 8 and 9.

When the flux of one of the beams, for example of the reference beam $62_2$, falls on the faceted face 71 of the device 66, only one of the pairs of mutually coplanar facets, namely facets 73 and 74, returns part of said beam towards the oscillating or vibrating mirror 81, and this by the reflecting zones of said facets. The other pair of coplanar facets 72, 75 directs the remainder of the beam onto a path by passing the mirror 81, this remainder being therefore not used. The initial part of the beam, i.e. the ray bundle 82, is reflected by mirror 81 towards grating 83; the dispersed beam 84, which returns to mirror 81, is sent back along a path 85 trained precisely onto the facets 73 and 74 from which it issued, according to the principle of autocollimation. It traverses the block 67 by penetrating the transparent zones of the diagonally adjoining facets 73 and 74 whereupon the output reference beam 86 falls, after reflection on a mirror 90, on a pickup device 87; the part of the beam 82 issuing from the face 73 provides that part of the beam 85 which falls on the facet 74 and the part of the beam 82 issuing from the facet 74 provides that part of the beam 85 which falls on the facet 73, said parts of the beam 85 traverse the facets 73 and 74 respectively through the transparent zones thereof, the opaque and reflecting zones of said facets evidently not being traversed.

When grating 83 is in its position corresponding to a wavelength of a radiation carried by the beam $62_2$, then, in the position of the vibrating mirror 81 in which the image of facet 73 projected with this said wavelength, is in zone-by-zone coincidence with facet 74 (and vice versa), the quantity of energy carried on this wavelength by beam 86 emerging from device 66 at a maximum. For this energy a graph similar to the curve $L_0$ of FIG. 3 can be drawn. For any position of mirror 81 differing from that just considered, the quantity of energy on this wavelength carried by the beam 86 is smaller and the variation as a function of the position of the mirror 81 (or, if the latter undergoes periodic oscillations, as a function of time) is represented by a succession of pulses with steep slopes separated by level portions. For any energy of different wavelength carried by the beam 86, the diagram representative of the quantity of this energy carried by the beam 86 emerging from the device 66 is a substantially horizontal line.

The measuring beam $63_2$ arrives at block 67 via a path symmetrical to that of beam $62_2$ with respect to the plane 79 (FIG. 11) passing through the junction line 76, 77 at right angles to the end face 68. For the measuring beam, the other coplanar facets, namely facets 72 and 75, are operational, i.e., they reflect part of the beam $63_2$ towards mirror 81, the facets 73 and 74 reflecting the incident rays of said measuring beam in a direction bypassing the mirror 81. The part of the beam reflected towards mirror 81 carries, when no sample is present, strictly the same energies as the corresponding part of the reference beam 82.

For the measuring beam, the operation of the device is similar to that which has been described for the reference beam. For said measuring beam, the input and output device is constituted by the pair of coplanar facets 72, 75. The part of the measuring beam reflected by the reflecting zones of facet 72 falls, after treatment by mirror 81 and grating 83, on the facet 75. The part of the beam reflected by the reflecting zones of the facet 75 falls, after processing by the grating 83 and double reflection on mirror 81, on the facet 72.

By reason of the aforedescribed "complementary" pattern of the zones of said facets 72 and 75, in a given position of grating 83 and with the vibrating mirror 81 in its position of coincidence, the quantity of energy of the measuring beam, on the wavelength corresponding to said position of the grating, traversing the diagonally adjoining facets 72 and 75 and reaching pickup device 87 via path 88 after reflection of the mirror 90 is nil. The image of any transparent zone of a facet 72 or 75 on the other facet, 75 or 72, is then in coincidence with an opaque zone of said facet 75 or 72.

If there is plotted a graph on which the ordinate is the energy of the output measuring beam 88 falling on the pickup device 87 after traversal of the device 66, the point corresponding to the condition just defined is therefore on the axis of the abscissae. During the vibration of mirror 81, with the grating remaining in its adjustment position—or executing a sufficiently slow scanning movement to be considered as substantially stationary during a cycle of the high-frequency vibrations of the mirror (a condition also applicable to the previously described embodiments and illustrated diagrammatically by an arrow A), the energy on said wavelength striking the pickup device 87 is represented in FIG. 3 by the curve $L_0'$ if no sample is interposed in the path of the measuring beam. The energy carried by the measuring beam on a wavelength other than the adjustment wavelength and reaching the pickup device is, on the other hand, represented by a substantially horizontal line. The same conditions as explained above for the first embodiment are again encountered. The resulting output of the pickup device is then a continuous signal, so that its amplification in an AC amplifier 87', following the pickup device, provides a null signal.

When a sample is interposed in the path of the measuring beam, the graphs representative of the energies carried on the reference beam are not modified. On the other hand, the curve representative of the energy carried by the measuring beam on the adjustment wavelength is that which is shown in the lower graph of FIG. 4; the amplitudes of the pulses corresponding to the measuring beam are smaller than the amplitudes of the pulses corresponding to the reference beam. Then there emerges from the receiver a modulated signal, as shown by the graph given in broken lines at the upper part of FIG. 4 with a depth of modulation characteristic of the absorptivity of the interposed sample. At the output of the AC amplifier 87' tuned to the modulation frequency, accordingly there is collected a signal whose amplitude is indicative of the absorption of the sample on the wavelength corresponding to the adjustment position of the grating.

Depending on the setting of the mean position of the vibrating member with respect to its "position of coincidence," the frequency of modulation can be equal to the frequency of vibration or twice the latter, as explained above.

In the embodiment last described, also, the output of the AC amplifier 87' may be used in a regulating circuit in order to control the position of an attenuator (such as device 52, FIG. 7) interposed in the path of the reference beam, to keep at every moment the energies carried on the adjustment wavelength by the output reference beam, on the one hand, and, on the other hand, on the output measuring beam, the position of said attenuator being then characteristic of the absorption coefficient of the of the sample for the wavelength corresponding to the position of the grating.

An inspection of FIG. 12 reveals that the zonal pattern of each facet of the transport block 67 is divided into four sectors whose boundaries, including angles of 45° with the line of intersection 76 shown in FIG. 10, are the asymptotes of a family of hyperboloidal curves separating the alternately transmissive and nontransmissive zones. As seen in FIG. 10, one of the two intersectoral boundary lines of each facet terminates at the central point of face 71 in which the four facets meet.

It will be noted that the peaks shown in FIGS. 3–6 have the shape of waves whose frequency is considerably higher than the cadence of these peaks which, as pointed out above, may be either equal to or double the vibration frequency of the oscillatory system. Thus, the alternating-current amplifier 22' or 87' is advantageously tuned to a frequency which is a multiple of the frequency of vibration.

I claim:
1. A spectrophotometer comprising:
  a source of radiation of at least one wavelength absorbable by a sample to be analyzed;
  a first gate pair including an input gate and an output gate provided with optically equivalent patterns of two alternating sets of zones of different transmissivity for said radiation;
  a second gate pair including an input gate and an output gate provided with optically complementary patterns of two alternating sets of zones of different transmissivity for said radiation;
  beam-splitting means confronting said source for deriving a reference beam and a measuring beam from the radiation thereof;
  beam-directing means forming a first path for said reference beam and a second path for said measuring beam, said first path including one of said gate pairs, said second path including the other of said gate pairs, said second path further including means for receiving said sample at a location ahead of the associated input gate;

dispersive means positioned in both said paths between said input and output gates for spreading said first and second beams in a predetermined spectrum-spread direction;

oscillatable beam-deflecting means positioned in both said paths between said input and output gates for periodically diverting said first and second beams in a direction perpendicular to said spectrum-spread direction;

vibrator means coupled with said beam-deflecting means for oscillating same whereby, with said dispersive means substantially stationary during an oscillatory cycle and set to detect a selected wavelength, each of said beams generates at least one sharp pulse per cycle in the amount of radiant energy passed by the corresponding output gate upon said selected wavelength being present in said radiation, said pulses being of mutually opposite sign;

photoelectric pickup means disposed to receive said radiant energy of both said beams with substantial cancellation of said pulses upon equal absorption of the selected wavelength in both said beams;

and alternating-current-responsive circuit means tuned to a frequency at least equal to the operating frequency of said vibrator means and connected to said pickup means for energization thereby to indicate the magnitude of any amplitude difference of said pulses.

2. A spectrophotometer as defined in claim 1 wherein said input gates are closely juxtaposed at a first location and said output gates are closely juxtaposed at a second location, said first and second paths merging into a common path extending from said first location onward.

3. A spectrophotometer as defined in claim 2 wherein said beam-deflecting means comprises a vibratile mirror in said common path.

4. A spectrophotometer as defined in claim 3 wherein said common path forms two passes between said mirror and said dispersive system.

5. A spectrophotometer as defined in claim 4 wherein in said passes coincide, said input gates being closely juxtaposed with said output gates.

6. A spectrophotometer as defined in claim 5 wherein the gates of each pair are coplanar and the planes of said pairs intersect at an acute angle, the gates of each pair lying on opposite sides of the line of intersection of said planes.

7. A spectrophotometer as defined in claim 6 wherein the gates of one coplanar pair lie on the levels of respective gates of the other coplanar pair in planes transverse to said line of intersection.

8. A spectrophotometer as defined in claim 5 wherein all said gates are facets on a face of a common block.

9. A spectrophotometer as defined in claim 8 wherein said block consists of transparent material.

10. A spectrophotometer as defined in claim 3 wherein said mirror is positioned to project a registering image of the input-gate patterns upon the corresponding output-gate patterns, by radiation of the selected wavelength, in a midposition of its oscillatory stroke.

11. A spectrophotometer as defined in claim 3 wherein said mirror is positioned to project a registering image of the input-gate patterns upon the corresponding output-gate patterns, by radiation of the selected wavelength, in an end position of its oscillatory stroke.

12. A spectrophotometer as defined in claim 1 wherein said circuit means comprises an amplifier tuned to a frequency equaling a multiple of said operating frequency.

13. A spectrophotometer as defined in claim 1, further comprising adjustable attenuator means controlled by said circuit means and interposed in said first path for balancing the attenuation introduced by said sample in said second path.

14. A spectrophotometer as defined in claim 1, further comprising absorption-compensating means interposed in said second path at a location ahead of the associated input gate.

15. In a spectrophotometer, in combination:

a source of radiation of at least one wavelength absorbable by a sample to be analyzed;

beam-splitting means confronting said source for deriving a reference beam and a measuring beam from the radiation thereof;

a block having a face with four juxtaposed facets meeting at a central point, two of said facets forming a first coplanar pair and adjoining each other along a first diagonal, two other of said facets forming a second coplanar pair and adjoining each other along a second diagonal, the planes of said pair intersecting at an acute angle in a line passing through said central point, said facets being provided with geometrically similar patterns formed by two alternating sets of zones of different transmissivity for said radiation, the patterns of said first pair being optically equivalent, the patterns of said second pair being optically complementary, one set of zones of at least one facet of each pair being reflective;

reflecting means confronting said face;

dispersive means interposed between said reflecting means and said face;

first optical means for training said reference beam upon said one facet of said first pair for redirection by the reflective zones thereof through said dispersive means onto said reflecting means and return through said dispersive means to the other facet of said first pair for interception, by the corresponding zones thereof, of a radiation carried on said one wavelength;

second optical means for training said measuring beam upon said one facet of said second pair for redirection by the reflective zones thereof through said dispersive means onto said reflecting means and return through said dispersive means to the other facet of said second pair for interception, by the corresponding zones thereof, of radiation carried on said one wavelength whereby such radiation is differently retransmitted by said other facets;

pickup means positioned to intercept the radiation retransmitted by said other facets;

and means for interposing said sample in the path of said measuring beam.

16. The combination defined in claim 15 wherein said block consists of transparent material and said corresponding zones of one of said other facets are transparent.

17. The combination defined in claim 15 wherein said patterns are each divided into four sectors separated by mutually orthogonal boundaries, said boundaries including angles of 45° with said line.

18. The combination defined in claim 17 wherein said zones are bounded by hyperboloidal curves having asymptotes coinciding with said boundaries.

References Cited

UNITED STATES PATENTS

| | | | |
|---|---|---|---|
| 2,984,149 | 5/1961 | Herscher et al. | 356—89 |
| 3,246,557 | 4/1966 | Mertz et al. | 350—162 X |

FOREIGN PATENTS

| | | |
|---|---|---|
| 1,001,234 | 8/1965 | Great Britain. |

RONALD L. WIBERT, Primary Examiner

F. L. EVANS, Assistant Examiner

U.S. Cl. X.R.

356—89, 97; 250—237; 350—288, 171